Patented Jan. 8, 1935

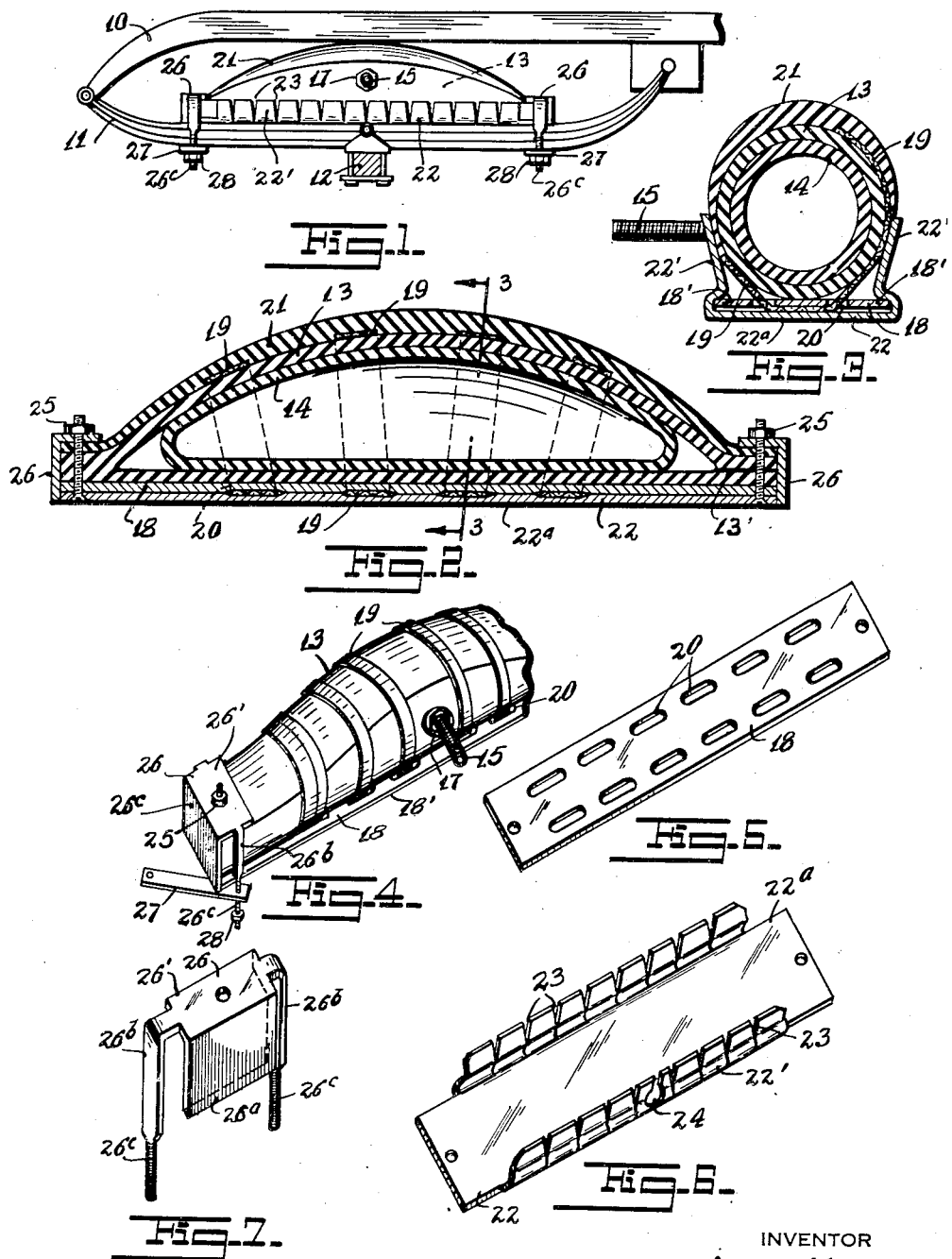

1,987,411

UNITED STATES PATENT OFFICE 1,987,411

SHOCK ABSORBER FOR MOTOR VEHICLES

Adam Muller, Bronx, N. Y.

Application May 1, 1934, Serial No. 723,333

9 Claims. (Cl. 267—31)

This invention relates to new and useful improvements in a shock absorber for motor vehicles and the like.

It is proposed to arrange the shock absorber in such a manner that it may be used in conjunction with the springs of a vehicle, or may be used auxiliary to the springs as for example at the bumpers or other places.

Still further the invention proposes the construction of a shock absorber which is characterized by a longitudinal casing of resilient material open at one end and containing a removable inflatable inner tube, and associated with a stiff flexible strip and stiff flexible base member in a particular fashion so as to form an efficient unit.

More particularly the invention proposes an arrangement whereby the stiff flexible strip is in intimate contact with the bottom of the casing and has its edges projecting and is connected with the casing by a flexible band laced through openings in the strip and around the casing, so that the flexible base may be associated with the edges of the strip for connection of these parts.

Still further the invention also proposes an arrangement whereby a resilient tread is attached upon the top of the casing over the flexible band so as to form a protection for the band and to increase its durability.

Still further the invention also proposes an arrangement whereby the stiff flexible base is characterized by side flanges bent to present opposed grooves adapted for slidable engagement upon the edges of the flexible strip for the engagement of these parts.

Still further the invention also proposes the particular method for attaching the ends of the casing, the stiff flexible strip, and the stiff flexible base member together in a unit.

Still further the invention also proposes the construction of a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a side elevational view of a vehicle spring equipped with a shock absorber according to this invention.

Fig. 2 is a longitudinal sectional view of the shock absorber, per se, illustrated in Fig. 1.

Fig. 3 is a transverse sectional view taken on the line 3—3 of Fig. 2.

Fig. 4 is a fragmentary perspective view of the shock absorber illustrated with the flexible base member removed.

Fig. 5 is a perspective view of the stiff flexible strip, per se.

Fig. 6 is a perspective view of the stiff flexible base member per se.

Fig. 7 is a perspective view of one of the brackets which is associated with the ends of the device for the purpose of holding the ends in a fixed unit and for the purpose of providing for the attachment of the device upon coacting objects.

The shock absorber according to this invention may be interposed between the chassis 10 of a vehicle and the springs thereof, such as spring 11. So that the device may better be understood, it is pointed out that the spring 11 is carried upon the axle 12 in a manner so that the chassis is supported on the axle. The shock absorber is interposed between the spring 11 and the chassis 12 and is held in place in such a manner so as to aid the resilient action of the spring in the resilient supporting of the chassis. This is only one of the many uses for the invention, since it may be associated with other parts requiring resilient action such as it may be associated with either of the bumpers of the vehicle, interposed between parts thereof to supplement the resilient action, or any other uses for the purposes of supplementing and aiding resilient action.

More particularly the shock absorber according to this invention comprises a longitudinal casing 13 of resilient material open at one end 13' and holding an inflatable inner tube 14 equipped with a valve controlled stem 15 for air. This stem 15 extends through the side of the casing 13 as clearly illustrated in Fig. 4, and is held in position with a clamping nut 17 threadedly engaged upon the stem and acting against the side of the casing. Details of this mounting will not be taken up in this specification since it is very similar to the mountings of valve control stems of the inner tubes of tires, which are generally known. The inner tube 14 may be removed from the opening 13' of the casing 13 as hereinafter further described.

The longitudinal casing 13 is arranged upon a stiff flexible strip 18 of material, such as metal, which is of a width so as to have its edges 18' projecting as clearly illustrated in Fig. 3. A flexible band 19 of similar material is laced through openings 20 formed in the strip 18 and is laced around the casing 13 so as to connect these parts in a unit and limit the possible expansion of the casing 13. Necessarily the casing must be constructed of expandable material such as rubber. The purpose of the laced band 19 is two-fold, (1) the attachment of the casing upon the strip, and (2) the limiting of the expansion. A resilient tread 21 is attached upon the top of the casing over portions of the band 19 so as to cover up the band and furthermore act as a reinforcement for the top of the casing 13. This tread may be secured in position by cementing, vulcanizing, or any other known process.

The strip 18 and the casing 13 is associated with a stiff flexible base member 22 having flanges 22' for engagement upon the sides of the casing 13 and a bottom portion 22ª for extending completely across the bottom of the casing 13. This bottom portion 22ª serves to cover and protect the lower portions of the flexible band 19. The flanges 22 are formed so as to produce a groove or passage into which the edges 18' of the strip 18 may engage. This arrangement allows for the disengagement of these parts by longitudinal sliding as hereinafter further described. Each of the flanges 22' are formed with a plurality of cuts 23 extended in from the top edges thereof and provided with an arrangement whereby the flanges are rendered flexible so that the bottom portion 22ª may flex or bend as conditions may require. One of the flanges 22' is formed with an opening 24 adapted for the passage of the valve control stem 15. Examining Fig. 3 it should be seen that the valve controlled stem 15 is below the top edge of the flange 22' and for this reason the opening 24 is necessary. The casing 13, the strip 18, and the base member 22 are connected into a unit by bolts 25 engaged through the ends thereof.

A bracket 26 is associated with each end of the shock absorber for the purpose of protecting the ends, and for better holding the ends in a unit. Each of these brackets are formed with a top arm 26' extending across the top of the casing 13 and a vertical end arm 26ª extending down the ends of the casing, the ends of the strip 18, and the base member 22. The bolts 25 also engage through the top arm 26' of the brackets. The brackets 26 are formed with side arms 26ª projecting from the sides of the top arm 26' and extending downwards and terminating in threaded portions 26ᶜ constituting a provision by which the shock absorber may be conveniently mounted upon some coacting element, as for example, the spring 11. It should be noted that the threaded portions 26' are disposed on opposite sides of the spring 11. A transverse bar 27 is engaged across each of the ends of the shock absorber and located beneath the spring 11; and the threaded portions 26' on each of the brackets extend through the bars 27. Nuts 28 are threadedly engaged upon the lower ends of the threaded portions 26ᶜ which serve to hold the shock absorbers in position.

The shock absorber illustrated in Fig. 1 is in condition to function and add to the resilient action of the spring 11. If for any reason the inner tube 14 becomes punctured, it may be removed as follows: First the nuts 28 should be disengaged from the threaded portions 26ᶜ, the transverse bars 27 removed, and then the shock absorber removed from its position upon the spring 11. Next one of the bolts 25, the bolt upon the end of the shock absorber which has the open end 13' of the casing, should be removed so as to free the casing 13, the strip 18, and the bottom portion 22ª of the bracket 22. Then the opening 13 may be spread open so that the inner tube may be removed.

The stem 15 must be freed so as to be capable of going into the casing 13 upon the removing of the inner tube. This is possible by first removing the nut 17 similar to the arrangement in tires wherein the inner tubes are provided with threaded stems engaging into the shoes or other similar objects.

If desired the other bracket 26 may also be removed and then the base member 22 may be removed from the strip 18 by longitudinally sliding so as to disengage the strip from the bulged or grooved portions of the casing. Such disconnection is of advantage in the replacement of damaged parts and also in substitution of parts.

It is to be understood that tread member 21 may be of any thickness, shape or length and may also be so arranged as to cover the upper surface of brackets 26.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A shock absorber, comprising a longitudinal casing of resilient material open at one end, an inflatable inner tube within said casing and having a valve controlled stem for air extending through the side of said casing, a stiff flexible strip in intimate contact with the bottom of said casing and having its edges projecting, a flexible band laced through openings in said strip and around said casing, a resilient tread attached on top of said casing over portions of said band, a stiff flexible base member with flange members bent in a manner forming a sliding fit over the edges of said strip, and bolts engaged through the ends of said casing, said strip and said base member.

2. A shock absorber, comprising a longitudinal casing of resilient material open at one end, an inflatable inner tube within said casing and having a valve controlled stem for air extending through the side of said casing, a stiff flexible strip in intimate contact with the bottom of said casing and having its edges projecting, a flexible band laced through openings in said strip and around said casing, a resilient tread attached on top of said casing over portions of said band, a stiff flexible base member with flange members bent in a manner forming a sliding fit over the edges of said strip, and bolts engaged through the ends of said casing, said strip and said base member, said longitudinal casing having its ends flattened out.

3. A shock absorber, comprising a longitudinal casing of resilient material open at one end, an inflatable inner tube within said casing and having a valve controlled stem for air extending through the side of said casing, a stiff flexible strip in intimate contact with the bottom of said casing and having its edges projecting, a flexible band laced through openings in said strip and around said casing, a resilient tread attached on top of said casing over portions of said band, a stiff flexible base member with flange members bent in a manner forming a sliding fit over the edges of said strip, and bolts engaged through the ends of said casing, said strip and said base member, said inflatable inner tube being removable from the opened end of said casing upon the removal of the bolt engaged through the ends of the casing, the strip and the base member.

4. A shock absorber, comprising a longitudinal casing of resilient material open at one end, an inflatable inner tube within said casing and having a valve controlled stem for air extending through the side of said casing, a stiff flexible strip in intimate contact with the bottom of said casing and having its edges projecting, a flexible band laced through openings in said strip and around said casing, a resilient tread attached on top of said casing over portions of said band, a stiff flexible base member with flange members bent in a manner forming a sliding fit over the edges of said strip, and bolts engaged through the ends of said casing, said strip and said base member, said resilient tread being vulcanized in position upon said casing.

5. A shock absorber, comprising a longitudinal casing of resilient material open at one end, an inflatable inner tube within said casing and having a valve controlled stem for air extending through the side of said casing, a stiff flexible strip in intimate contact with the bottom of said casing and having its edges projecting, a flexible band laced through openings in said strip and around said casing, a resilient tread attached on top of said casing over portions of said band, a stiff flexible base member with flange members bent in a manner forming a sliding fit over the edges of said strip, and bolts engaged through the ends of said casing, said strip and said base member, the side flanges of said stiff flexible base member being formed with a plurality of cuts extended in from the top edges thereof.

6. A shock absorber, comprising a longitudinal casing of resilient material open at one end, an inflatable inner tube within said casing and having a valve controlled stem for air extending through the side of said casing, a stiff flexible strip in intimate contact with the bottom of said casing and having its edges projecting, a flexible band laced through openings in said strip and around said casing, a resilient tread attached on top of said casing over portions of said band, a stiff flexible base member with flange members bent in a manner forming a sliding fit over the edges of said strip, and bolts engaged through the ends of said casing, said strip and said base member, the side flanges of said stiff flexible base member being formed with a plurality of cuts extended in from the top edges thereof, and said stem engaging through a cut formed in one of said flanges.

7. A shock absorber, comprising a longitudinal casing of resilient material open at one end, an inflatable inner tube within said casing and having a valve controlled stem for air extending through the side of said casing, a stiff flexible strip in intimate contact with the bottom of said casing and having its edges projecting, a flexible band laced through openings in said strip and around said casing, a resilient tread attached on top of said casing over portions of said band, a stiff flexible base member with flange members bent in a manner forming a sliding fit over the edges of said strip, bolts with nuts threaded thereon and engaged through the ends of said casing, said strip and said base member, and brackets associated with the bolts of said shock absorber and held in position with said nuts.

8. A shock absorber, comprising a longitudinal casing of resilient material open at one end, an inflatable inner tube within said casing and having a valve controlled stem for air extending through the side of said casing, a stiff flexible strip in intimate contact with the bottom of said casing and having its edges projecting, a flexible band laced through openings in said strip and around said casing, a resilient tread attached on top of said casing over portions of said band, a stiff flexible base member with flange members bent in a manner forming a sliding fit over the edges of said strip, bolts with nuts threaded thereon and engaged through the ends of said casing, said strip and said base member, and brackets associated with the bolts of said shock absorber and held in position with said nuts; each of said brackets comprising a top arm extending across the top of said casing and connected with an end arm extending down the end of the casing, the strip and the base member.

9. A shock absorber, comprising a longitudinal casing of resilient material open at one end, an inflatable inner tube within said casing and having a valve controlled stem for air extending through the side of said casing, a stiff flexible strip in intimate contact with the bottom of said casing and having its edges projecting, a flexible band laced through openings in said strip and around said casing, a resilient tread attached on top of said casing over portions of said band, a stiff flexible base member with flange members bent in a manner forming a sliding fit over the edges of said strip, bolts with nuts threaded thereon and engaged through the ends of said casing, said strip and said base member and brackets associated with the bolts of said shock absorber and held in position with said nuts, each of said brackets comprising a top arm extending across the top of said casing and connected with an end arm extending down the end of the casing, the strip and the base member, and side portions projecting from the sides of said top arm and terminating in threaded portions for the attachment of the shock absorber upon some object.

ADAM MULLER.